(12) United States Patent
Eklund et al.

(10) Patent No.: US 6,180,726 B1
(45) Date of Patent: Jan. 30, 2001

(54) HIGH TEMPERATURE RESISTANT COATING COMPOSITION AND METHOD OF USING THEREOF

(75) Inventors: Wayne G. Eklund, Scandia; Paula Bushendorf, Minneapolis, both of MN (US)

(73) Assignee: H. B. Fuller Licensing & Financing Inc., St. Paul, MN (US)

( * ) Notice: Under 35 U.S.C. 154(b), the term of this patent shall be extended for 0 days.

(21) Appl. No.: 09/037,543

(22) Filed: Mar. 10, 1998

(51) Int. Cl.$^7$ .............................. C08F 8/00; C08L 83/00; C08L 67/00; C08L 71/02; C08G 65/32

(52) U.S. Cl. ................... 525/408; 427/372.2; 427/385.5; 427/386; 428/413; 525/103; 525/106; 525/112; 525/186; 525/193; 525/207; 525/208; 525/209; 525/222; 525/285; 525/438

(58) Field of Search ..................... 525/103, 106, 525/112, 186, 193, 207, 208, 209, 222, 285, 408, 438; 428/413; 427/372.2, 385.5, 386

(56) References Cited

U.S. PATENT DOCUMENTS

| | | |
|---|---|---|
| 2,870,170 | 1/1959 | Payne et al. . |
| 2,951,822 | 9/1960 | Reinking . |
| 2,951,825 | 9/1960 | Reinking et al. . |
| 3,397,254 | 8/1968 | Wynstra et al. . |
| 4,092,373 | 5/1978 | Siwiec et al. . |
| 4,101,596 | 7/1978 | Mitchell et al. . |
| 4,102,701 | 7/1978 | Campbell et al. . |
| 4,169,825 | 10/1979 | Yapp et al. . |
| 4,204,014 | 5/1980 | Dorffel et al. . |
| 4,424,296 | 1/1984 | Antonelli . |
| 4,459,391 | 7/1984 | Arai . |
| 4,501,853 | 2/1985 | Sugimori et al. . |
| 4,621,122 | 11/1986 | Guilbert et al. . |
| 4,751,258 | 6/1988 | Minami . |
| 4,879,344 | 11/1989 | Woo et al. . |
| 5,077,354 | * 12/1991 | Woo et al. ............... 528/26 |
| 5,114,993 | 5/1992 | Scherping et al. . |
| 5,264,469 | 11/1993 | Mysliwczyk et al. . |
| 5,265,510 | 11/1993 | Hoyer-Ellefsen . |
| 5,684,066 | * 11/1997 | Eklund et al. ............ 523/435 |

FOREIGN PATENT DOCUMENTS

| | | |
|---|---|---|
| 1 480 050 | 7/1967 | (FR) . |
| 1 365 752 | 9/1974 | (GB) . |

* cited by examiner

*Primary Examiner*—Patrick D. Niland
(74) *Attorney, Agent, or Firm*—Nancy N. Quan; Bin Su

(57) ABSTRACT

The present invention relates to a high temperature resistant coating composition and a method of using thereof. More particularly, the invention relates to a coating composition comprising a resin containing functional hydroxyl groups (A), a polyfunctional epoxy resin (B), and an anhydride compound.(C).

26 Claims, No Drawings

HIGH TEMPERATURE RESISTANT COATING COMPOSITION AND METHOD OF USING THEREOF

FIELD OF THE INVENTION

The present invention generally relates to a high temperature resistant coating composition and a method of using thereof. More particularly, the invention is directed to a coating composition comprising a resin containing functional hydroxyl groups (A), a polyfunctional epoxy resin (B) and an anhydride compound (C), which can be exposed after curing to a wide range of temperatures and provide outstanding adhesion, color/gloss retention properties, and low thermoplasticity.

BACKGROUND OF THE INVENTION

In general, a coating composition is required to have the following properties: a) possession of good melt flow necessary to form a coating film on a surface and a proper curing time at a temperature above 120° C.; b) possession of sufficient glass transition temperature after baking; c) necessity to be solid and brittle in order to permit easy pulverization at processing temperature; d) possession of free fluidity at a temperature below 45° C. without blocking; and e) capacity of being melt mixed with auxiliary substances such as pigment or filler and additives without undergoing premature crosslinking.

A number of coating compositions, have been used which employ alkyd resins, vinyl resins and silicone resins. However, these coating compositions do not necessarily satisfy the required properties. Usually, developing an advantage of one property leads to a deficiency in another property, thereby posing restrictions on the practical use.

Numerous prior art teachings relate to liquid coating composition comprising low molecular weight hydroxy terminated polyesters crosslinked with nitrogen resins or polyisocyanates such as Antonelli, U.S. Pat. No. 4,424,296. Dorffel et al., U.S. Pat. No. 4,101,596 and U.S. Pat. No. 4,204,014 employ curing agents such as aminoplast.

Yapp et al., U.S. Pat. No. 4,169,825 disclose a high solids liquid coating composition comprising low molecular weight hydroxy-terminated polyester, epoxy resin and at least one crosslinking agent such as an isocyanate, an alkoxy alkyl melamine or an amino condensation product.

Other relevant liquid coating compositions include Mysliwczyk, U.S. Pat. No. 5,264,469 which discloses a reaction product of an epoxy resin with carboxyl functional addition polymer, an epoxy phosphate ester polymer and a curing agent such as phenoplast or aminoplast resin.

Patel, U.S. Pat. No. 4,751,256 discloses a heat curable coating composition comprising an aqueous dispersion of epoxy resin, acrylic resins which are copolymers of polymerizable acids and other monomers and alkylated phenol novolac resin.

Scherping et al., U.S. Pat. No. 5,114,993 disclose an aqueous coating composition comprising an epoxy resin, polyester polycarboxylic acid, ethylenically unsaturated monomers containing carboxyl groups, peroxide initiator, crosslinking agent such as phenolic resins and/or amino resins, neutralizing agent, organic solvent and other additives.

Kwon et al., U.S. Pat. No. 5,265,510 disclose a powder coating composition comprising a carboxyl terminated polyester resin and diglycidyl bisphenol epoxy resin which is treated with pyromellitic dianhydride and adipic acid or azelaic acid groups.

Siwiec et al., U.S. Pat. No. 4,092,373 disclose a powder coating composition comprising a mixture of epoxyfunctional copolymer of a glycidyl ester of a monoethylenically unsaturated monomer, an anhydride crosslinking agent such as monomeric anhydrides of dicarboxylic acids and homopolymers of monomeric anhydrides of dicarboxylic acids and a hydroxycarboxylic acid.

Arai et al., U.S. Pat. No. 4,459,391 disclose a method of improving the heat resistance of a polyester by reacting a polyester with diglycidyl substituted diamides and keeping the carboxyl group below 15 gram equivalent per $10^6$ gram of the polymer.

Guilbert et al., U.S. Pat. No. 4,621,122 disclose a powder coating composition which can withstand a temperature of 200° C. The powder coating composition comprises an acid terminated polyester of an aromatic dicarboxylic acid and a diphenol; an epoxy terminated adduct of a hydantoin diepoxide and an aromatic dicarboxylic acid and an imide dissolved in hydantoin diepoxide; a bismaleimide and a fumaric acid.

Previous coating compositions suffer from disadvantages that include poor color stability at elevated temperature, degradation of gloss with time and temperature, and diminished adhesion after exposure with time at a high temperature. Another disadvantage is that often brittle inflexible coatings are obtained by these types of coating compositions.

There remains a need for a coating composition which overcomes the drawbacks of the prior art. Surprisingly, a resin containing functional hydroxy groups combined with a polyfunctional epoxy resin and an anhydride compound, provides improved adhesion, color/gloss retention, good flow properties, excellent processability, storage stability and low thermoplasticity. The films prepared from the coating compositions are excellent in mechanical, weather, heat and solvent resistance. The composition produces a finish that is able to withstand a prolonged exposure of about 0° C. to about 300° C. The coating has a highly superior adhesion after heating at 300° C. as compared to other silicone and non-silicone containing heat resistant coating composition.

SUMMARY OF THE INVENTION

The present invention is generally directed to a coating composition comprising:

a) at least one resin containing functional hydroxyl groups (A);

b) at least one polyfunctional epoxy resin (B); and c) at least one anhydride compound (C).

In another, more particular aspect, the invention is directed to a high temperature resistant coating composition comprising the reaction product of:

a) at least one resin containing functional hydroxyl groups (A);

b) at least one polyfunctional epoxy resin (B); and c) at least one anhydride compound (C).

Another aspect of the present invention is to provide a coating composition wherein the resin containing functional hydroxyl groups (A) has an average molecular weight of from about 500 to about 10,000, an hydroxyl value of about 10 to about 300 and a glass transition temperature of about 30° C. to about 75° C.

Still another aspect of the invention is to provide a coating which will maximize film properties such as flexibility, hardness, adhesion, low thermoplasticity, color/gloss retention, weatherability and solvent resistance in a wide temperature range of low temperature to high temperature.

Yet another aspect of the present invention is to provide a method of coating a substrate with a coating composition comprising the steps of:

a) providing a coating composition comprising:
 i) at least one resin containing functional hydroxyl groups (A);
 ii) at least one polyfunctional epoxy resin (B); and
 iii) at least one anhydride compound (C).

b) applying to at least one substrate a layer of the coating composition; and c) heating the coating layer at a temperature of about 100° C. to about 300° C.

Other aspects of the present invention would be apparent to one of ordinary skill in the art.

DETAILED DESCRIPTION OF THE INVENTION

The following glossary is provided as an aid to understand the use of certain terms herein. The explanations provided in the glossary are for illustrative purposes and do not limit the scope of the invention.

The term "resin containing functional hydroxyl groups" refers to a resin having at least two or more functional hydroxyl groups and a weight average molecular weight (Mw) in the range of from about 500 to about 10,000, preferably from about 2,000 to about 6,000, more preferably about 3,000. The resin containing hydroxy functional groups has an acid number of less than about 14, preferably less than about 12; and a viscosity of about 2000 to about 6000 cP at 200° C., more preferably about 3500 to about 4500 at 200° C. The resin containing hydroxyl functional groups includes hydroxy functional polyester resins, hydroxy functional acrylic resins, hydroxy functional silicone resins, allyl alcohol containing resin and mixtures thereof. A preferred resin containing hydroxyl functional groups is a hydroxy functional polyester resin.

The term "polyfunctional epoxy" refers to epoxy resins having more than one epoxy groups. Epoxy equivalency refers to the average number of epoxy groups contained in an average polyfunctional epoxy compound. It is determined by titration of the epoxy groups with hydrogen halide. For example, for a linear diepoxide, the epoxide equivalent is half the number average molecular weight.

"Hydroxyl value" or number, also called the acetyl value is a number which indicates the extent to which a substance may be acetylated. It is the number of milligrams of KOH equivalent to the free hydroxyl groups often as end groups present in 1 gram of a polymer. The hydroxyl value is determined by acetylation with acetic anhydride and titration of the excess anhydride with KOH. The hydroxyl value of the hydroxy functional resin is about 10 to about 300, preferably from about 10 to about 200, more preferably from about 20 to about 50.

The term "phr" refers to parts per hundred of the resin. The resins in accordance with the present invention include the resin containing functional hydroxyl groups, polyfunctional epoxy resin, and anhydride compound.

The hydroxy functional polyesters are made from aromatic and/or saturated aliphatic acids and polyols by, for example, methods which are described in detail in Ullmann's Encyclopedia of Industrial Chemistry" Verlag Chemie Weinheim, 4th ed. (1980) vol. 19, pages 61 ff and H. Wagner and H. F. Sarxin "Lackkunstharze", Carl Hanser Verlag, Munchen (1971), pages 86–152, both of which are incorporated herein by reference. The esterification is optionally carried in the presence of catalytic amount of any of the conventional catalysts such as acids, bases and transition metal compounds, e.g., titanium tetrabutylate.

In the production of hydroxy functional polyesters, one or more of the following groups of monomer components are employed:

a) (cyclo)alkanediols, i.e., dihydric alcohols with cyclo aliphatically bonded hydroxyl groups in the molecular weight range of from about 62 to about 286 such as ethylene glycol, diethylene glycol, dipropylene glycol, 1,2- and 1,3-propanediol, 1,2-, 1,3- and 1,4-butanediol, 1,5-pentanediol, 1,2-1,3- and 1,4-butanediol, 1,6-hexanediol, neopentyl glycol cyclohexane-1,4-dimethanol, 1,2- and 1,4-cyclohexanediol, 2,2-bis(4-hydroxyethyloxy)phenylpropane, 2,2-bis(4-hydroxycyclohexyl)propane or reaction products of these diols with, -caprolactone, ethylene oxide and/or propylene oxide and mixtures thereof;

b) tri- and higher hydric alcohols in the molecular weight range of from about 92 to about 254 such as trimethylolpropane, glycerol, pentaerythritol and dipentaerythritol, 1,2,6hexane triol, 1,1,1,trimethylol ethane, tris(2hydroxyethyl)isocyanurate and mixtures thereof.

c) aliphatic polycarboxylic acids include succinic acid, glutaric acid, adipic acid, pimelic acid, suberic acid, azelaic acid, sebacic acid, diglycolic acid, 1,12 dodecanoic acid, tetrapropenyl succinic acid, maleic acid, fumaric acid, itaconic acid, malic acid, etc. Aromatic polycarboxylic acids include phthalic acid and its anhydride, isophthalic acid, benzophenone dicarboxylic acid, diphenic acid, 4,4-dicarboxydiphenyl ether, 2,5-pyridine dicarboxylic acid, trimellitic acid, etc; dicarboxylic acids in the molecular weight range of from about 116 to about 600 and/or their anhydrides such as tetrahydrophthalic acid, tetrahydrophthalic anhydride, hexahydrophthalic acid, hexahydrophthalic anhydride, terephthalic acid, fumaric acid, maleic acid, maleic anhydride, adipic acid, hydrogenated dimeric fatty acids and mixtures thereof and optionally;

d) monocarboxylic acids such as benzoic acid, 2-ethylhexanoic acid, caproic acid, octanoic acid, capric acid, or lauric acid and mixtures thereof.

Commercially available polyesters include Rucote™ from Ruco Polymer, Hicksville, N.Y. When the hydroxy functional polyester is used, it is present in an amount of about 10 to about 80 phr, preferably about 30 to about 60 phr.

The hydroxy functional acrylic resin includes for example, copolymers of allyl alcohol, hydroxyl containing acrylic monomers and other vinyl monomers copolymerizable therewith as disclosed in Fukuda et al., U.S. Pat. No. 5,087,286, incorporated herein by reference. Examples of the hydroxyl containing acrylic monomers include $C_2$–$C_{24}$ hydroxyalkyl(meth)acrylates such as 2-hydroxyethyl(meth) acrylate, hydroxypropyl (meth)acrylate, hydroxybutyl (meth)acrylate; and mono- or di-($C_1$–$C_{12}$ hydroxyalkyl) amides such as N-methylol acrylamide, N-methylol methacrylamide, N-hydroxyethyl methacrylamide, N,N-dihydroxyethyl acrylamide, and N,N-dihydroxyethyl methacrylamide.

Examples of vinyl monomers copolymerizable with these hydroxyl containing acrylic monomers include $C_1$–$C_{24}$ alkyl (meth)acrylates such as methyl (meth)acrylate, ethyl (meth)

acrylate, propyl (meth)acrylate, n-butyl (meth)acrylate, isobutyl (meth)acrylate, pentyl (meth)acrylate, hexyl (meth)acrylate, n-octyl (meth)acrylate, nonyl (meth)acrylate, lauryl (meth)acrylate, 2-ethylhexyl (meth)acrylate, 2-ethylbutyl (meth)acrylate, decyl (meth)acrylate, stearyl (meth)acrylate; acrylonitrile, methacrylonitrile; carboxyl containing vinyl monomers such as (meth)acrylic acid and crotonic acid; vinyl aromatic compounds such as styrene, alpha methyl styrne, vinyl toluene and p-chlorostyrene; polyolefin compounds such as butadiene, isoprene, and chloroprene; vinyl esters such as vinyl acetate, Veova monomer from Shell Co., vinylpropionate, vinyl pivalate, and epoxy containing vinyl monomers such as glycidyl acrylate, glycidyl methacrylate, and allyl glycidyl ether. Examples of commercially available acrylic resins include Johncryl™ 587 from S. C. Johnson, Racine, Wis. and Fineclad™A-244-A from Reichold, Durham, N.C.

When the hydroxy functional acrylic is used, it is present in an amount of about 10 to about 80 phr, preferably about 30 to about 60 phr.

Other suitable resin containing functional hydroxyl groups include copolymers of allyl alcohol and styrene such as SAA™ 103 from Arco. When the copolymers of allyl alcohol and styrene are used, they are present in an amount of about 10 to about 80 phr, preferably about 30 to about 60 phr.

When a hydroxy functional polysiloxane is used, the hydroxy functionality is up to about 10% by weight, preferably in a range from about 0.5% by weight to about 10.0% by weight, more preferably from about 1.0% by weight to about 7.0% by weight, and most preferably from about 1% to about 4% by weight based on the total polysiloxane solids.

When the silicone resin is used, it is present in a range of from about 20.0 phr to about 60.0 phr, and preferably from about 25.0 phr to about 45.0 phr. The silicone resin can be any alkyl and/or aryl substituted polysiloxane, copolymer, blend or mixture thereof, the alkyl substitution preferably selected from alkyl groups of 1 to 4 carbon atoms, more preferably 1 to 3 carbon atoms, and most preferably methyl, propyl and the aryl substitution most preferably comprising phenyl groups. The compositions may include hydroxy functional organo-siloxanes, said organo-siloxane comprises units, including dimethyl, diphenyl, methyl-phenyl, phenylpropyl and their mixtures. Examples of commercially available hydroxy functional polysiloxanes include Dow Corning® 1-0543, Dow Corning® 6-2230 and Dow Corning® Z-6018 from Dow Corning (Midland, Mich.); Wacker Silres® MK and Wacker Silres® 601 from Wacker Silicone Corp., (Adrien, Mich.); General Electric SR-355 from General Electric (Waterford, N.Y.); and PDS-9931 from Gelest, Inc., (Tullytown, Pa.). Other suitable silicone-based polymers include those described in Fujiyoshi et al., U.S. Pat. No. 4,107,148 and Woo et al., U.S. Pat. No. 4,879,344, both of which are incorporated herein by reference. Said polymers can self-condense and/or react with glycidyl functional polymers to form a crosslinked network.

The polyfunctional epoxy resin (B) suitable for the purpose of this invention are those organic compounds having an oxirane epoxy equivalency of greater than one, i.e., compounds having an average of more than one oxirane epoxy group of formula I per molecule.

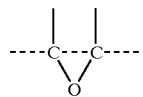

These compounds, wherein the oxygen of the epoxy group is attached to vicinal carbon atoms can be saturated or unsaturated, aliphatic, cycloaliphatic or heterocyclic and can be substituted with substituents such as halogen atoms, alkyl groups, ether groups and the like. Examples of suitable epoxides are polyglycidyl ethers of polyhydric phenols such as polyglycidyl ethers of such phenols as mononuclear polyhydric phenols, resorcinol, pyrogallol, xylenol, naphthol and cresol, the di-or polynuclear phenols such as bisphenol; polyphenols such as novolak condensates of a phenol and saturated or unsaturated aldehyde containing an average of 3 to 20 or more phenylol groups per molecule. Suitable epoxy resins are described in Sugimori et al., U.S. Pat. No. 4,501,853 and Wynstra et al., U.S. Pat. No. 3,397,254 and are incorporated herein by reference.

The resins are available from a wide variety of commercial sources under the trademark designation such as EPON™ or Epikote™ from Shell (Houston, Tex.), Araldite™ from Ciba Geigy Corp. (Hawthorne, N.Y.) and DER™ from DOW Chemical Company (Midland Mich.). Examples of epoxy resin include bisphenol A type epoxy resin such as Epikote™ 815, Epikote™ 828, Epikote™ 834, Epikote™ 1001 or Epikote™ 1002 from Shell Chemical Co.; a urethane modified bisphenol A type epoxy resin such as Adeka Resin™ EPU-6, Adeka resin™ EPU-10, Adeka resin™ EPU-15 from Asahi Denka Co.; novolak type epoxy resin such as Epikote™ 152 or Epikote™ 154 from Shell Chemical Co.; Dow Epoxy DEN™ 431, Dow Epoxy DEN™ 438 or Dow Epoxy DEN™ 439, DER™ 642 and DER™ 672 from Dow Chemical Co., Araldite™ 7220 from Ciba Geigy; a cresol novolak type epoxy resin such as Araldite™ ECN 1235, Araldite™ ECN 1273 or Araldite™ ECN1280 from Ciba Geigy Co.; and alicyclic type epoxy resin such as Araldite™ CY-179, Araldite™ CY-178, Araldite™CY-182, Araldite™CY-183 from Ciba Geigy Co. Other examples include bisphenol S epoxy, hydrogenated bisphenol A epoxy resin and aliphatic epoxy resin (propyleneglycoldiglycidylether or pentaerythritol polyglycidyl ether), glycidyl functional silicone resins, glycidyl functional acrylic resins or mixtures thereof Examples of commercially available glycidyl functional acrylic resins include Fineclad™A-244-A (Reichold, Durham, N.C.) and Almatex™ PD7690 (Anderson Co., Adrien, Mich.).

Solid epoxy resins derived from bisphenol, for example reaction products of bisphenol with epichlorohydrin are available as Epikote™ 1004, Epikote™ 1007 and Epikote™ 1009 from Shell Chemical Co. Hydrogenated bisphenols with epichlorohydrin are available as EPS 4085™ from Asahi Denka Kogyo KK. The solid epoxy resin, preferably has a softening point of more than 40° C.

Other suitable polyglycidyl resins are the polyglycidyl esters of polycarboxylic acid such as polyglycidyl esters of adipic acid, phthalic acid, terephthalic acid, trimellitic acid and the like. Examples include Araldite™ PT-910 (a mixture of glycidyl ester of trimellitic acid and terephthalic acid) from Ciba Geigy. When Araldite™ PT-910 is used, it is present in an amount of at least about 0.1 to about 30 phr, more preferably about 2 to about 10 phr.

Polyglycidyl esters of carboxylic acids are described in detail in Payne et al., U.S. Pat. No. 2,870,170 and GB-1 409

835 while the starting cycloaliphatic polycarboxylic can be prepared in accordance with U.S. Pat No. 4,102,701. Suitable examples include 2,2,5,5-tetra(β-carboxyethyl) cyclopentanone tetraglycidyl ester, 2,2,6,6-5-tetra(β-carboxyethyl)cyclohexanone tetraglycidyl ester, 2,2,4,4-tetra(β-carboxyethyl)pentan-3-one tetraglycidyl ester, or 1,1,3,3-tetra(β-carboxyethyl)acetone tetraglycidyl ester, glycidylamine type epoxy resin (such as tri- or tetraglycidylamine type epoxy resin), Araldite™ MY 720 from Ciba Geigy Co. Suitable polyglycidyl compounds are produced by reacting epichlorohydrin with aromatic amines such as aniline, 2,6-dimethylaniline, p-toluidine, m-chloroaniline, p-aminodiphenyl, m-phenylenediamine, p-phenylendiamine, 4,4'diaminodiphenylmethane or with aminophenol such as p-aminophenol, 5-amino-1-n-naphthol, 4-aminoresorcinol, 2-methyl-4-amino phenol, 2-chloro-4-aminophenol and the like. Specific compounds include among others are N,N-diglycidyl aniline, N,N-diglycidyl-2,6-dimethylaniline, N,N',N'-tetraglycidyl-4,4'-diaminodiphenylmethane, the triglycidyl derivatives of p-aminophenol wherein amino hydrogen and OH hydrogen atoms are replaced by glycidyl groups. Also suitable are peracetic acid epoxides obtained by epoxidation across a double bond using peracetic acid such as bis(2,3-epoxycyclopentyl)ether and the like. The polyglycidyl derivatives of aromatic amines and aminophenols and methods for the preparation are further described in Reinking, U.S. Pat. Nos. 2,951,825 and 2,951,822.

Other suitable polyfunctional epoxy resins include triglycidyl isocyanurate (TGIC) compounds or derivatives thereof, such as methyl substituted trigylcidyl isocyanurate, ethyl substituted triglycidyl isocyanurate and the like. The preferred TGIC has an epoxy content of at least about 90 to about 108 g/equivalent with a melting point of about 88° C. to about 98° C. TGIC is available as Araldite™ PT-810 from Ciba Geigy Co. When TGIC compound or derivative thereof is used, it is present in an amount of at least about 0.1 to about 30 phr, more preferably about 2 to about 10 phr. The TGIC compound or derivative thereof provides excellent hardening properties and blocking resistance. Though an isocyanurate ring is included in the present invention, it is excellent in flexibility because of the presence of the ester bonding and has superior curing properties. The cured coating is excellent in flexibility over a wide range of low to high temperature exposure. In addition, the coating has excellent coating appearance and higher qualities.

The polyfunctional epoxy resins (B) suitable for preparing the coating, preferably have at least two epoxy groups per molecule. When the polyfunctional epoxy resin such as epoxy novolac resin is used, it is present in an amount of at least 0 to about 50 phr, preferably about 10 to about 30 phr. The equivalent weight of the epoxy resins is preferably 300 to about 1500, most preferably, about 400 to about 700. The polyfunctional epoxy resin may be used singly or combined with other epoxy resin in preparing the high temperature resistant coating composition. A mixture of the polyester resin and polyfunctional epoxy resin such as epoxy novolac resin contains a weight ratio of about 1:0 to about 8:5, preferably, about 3:1 to about 6:3 is used. If the amount of epoxy resin exceeds 50 phr, the ultraviolet resistance and hardness of the resulting coating will suffer. The resulting film will become poor in weather resistance on outdoor exposure and also in luster and permit occurrence of chalking, thus making the coating film unsuitable for practical use.

Preferably used polyfunctional epoxy resins include epoxy novolac resin, TGIC, Araldite™ PT-910 or combinations thereof.

When preparing the coating composition, anhydride compounds (C) such as trimellitic anhydride, phthalic anhydride, pyromellitic anhydride, succinic anhydride, 1,8-naphthalic anhydride, 1,2-cyclohexanedicarboxylic anhydride, sebacic anhydride, maleic anhydride, azelaic anhydride, citric acid anhydride, hexahydrophthalic anhydride, tetrahydrophthalic anhydride, dodecanedioic anhydride, octadecenyl succinic anhydride, dodecenyl succinic anhydride, octenyl succinic anhydride, methyl hexahydrophthalic anhydride, 2,3,6,7-naphthalene tetracarboxylic acid dianhydride, ethylene bis (trimellitate(dianhydride, glycerin tris(trimellitate) trianhydride, bisphenol A bis(trimellitate(trianhydride, 3,31, 4,4'-benzophenontetracarboxylic anhydride, a dianhydride of cyclohexane tetracarboxylic, butane tetracarboxylic, tetrahydrofuran, tetracarboxylic and pyromellitic, or mixtures, derivatives and modifications thereof. The anhydride compound is added to improve adhesion and thermoplasticity. A preferred anhydride is 3,3',4,4'-benzophenonetetracarboxylic dianhydride (BTDA) and is commercially available from Allco, Kansas. Suitable BTDA has a molecular weight of about 322, a viscosity of about 8.51 cP at 460° C. and a melting point of about 221° C. to about 225° C. The anhydride compound is present in an amount of at least about 0.1 to about 30 phr, preferably about 6 to about 15 phr.

The present coating composition comprises the above resin containing functional hydroxyl groups, a polyfunctional epoxy resin, and an anhydride compound. However, it may optionally include various coating additives and auxiliary substances. Examples of such additives include:

a) surface regulating agent for the control of generation of crater and improvement in coating smoothness, for example, long chain alkyl ester of acrylic acid, polysiloxane and the like;

b) plasticizer such as polymeric resins, elastomers, waxes, oils and their mixtures and the like;

c) ultraviolet ray absorber and antioxidant;

d) degassing agent such as benzoin and the like;

e) hardening catalyst such as imidazole and the like;

f) flow agent such as Resiflow P-67; Modaflow™ (a copolymer of 2-ethylhexyl acrylate and ethyl acrylate), BUTBAR™ (Monsanto Co.), Acronal 4F™ (BASF), and the like. Other flow agents include polylauryl acrylate, polybutyl acrylate, poly(2-ethylhexyl acrylate), polylauryl methacrylate, polyisodecyl methacrylate and the like;

g) fluidizing agents such as Aerosil™ (Degussa), fumed silica, alumina oxides, their mixtures and the like;

h) wetting agents such as Surfynol™ 104S from Air Products, Inc., Hypermer™ PS-4 (ICI) and the like;

i) silicone and the like;

j) adhesion promoter such as Primacor™ (Dow Chemical) and the like.

Examples of auxiliary substances include:

a) coloring pigment, as for example, inorganic pigments such as titanium dioxide, iron red, yellow iron oxide, and the like; carbon black, black metal oxide (Black IG), phthalocyanine blue, phthalocyanine green, quinacridone red pigment and the like; ceramic black, chrome yellow, chrome orange, cadmium yellow, isoindolinome yellow, isoindolinome red, cobalt blue, cobalt green, phthalocyanine blue, ultramarine blue, ceramic titanate, ceramic spinel and the like.

b) fillers such as metallic and non-metallic oxides, e.g., aluminum, iron, calcium metasilicate, silicon dioxide, calcium carbonate, calcium sulfate, barium sulfate and the like;

When benzoin is used, it is present in an amount of 0.1–6% by weight, preferably 0.5–3% by weight of component (A). Addition of benzoin to the coating prevents the formation of pinholes effectively even when producing a thick film. If the amount of benzoin is less than 0.1 part by weight, no beneficial effect is achieved by its addition. If the amount of benzoin exceeds 6 parts by weight, free fluidity of the coating composition will decrease so that the composition easily tends to undergo blocking. In addition, yellowing of the coating film after baking becomes considerable so that the film is of no value for practical use.

When catalysts are used for the curing reaction, they can include titanium tetrabutylate, stannous octoate and imidazole. Examples of other catalysts include sulfonic acids such as toluenesulfonic acid, naphthalene 1,5-disulfonic acid; tetraalkylammonium salts such as tetrabutylammonium bromide, tetrabutylammonium chloride and tetrabutylammonium iodide; metal carboxylates such as zinc naphthenate, cobalt naphthenate, dibutyl tin dilaurate and lithium benzoate; alkali metal hydroxides and salts such as lithium hydroxide, lithium chloride; halogenated tin compounds such as stannous chloride, dimethyl tin chloride, dibutyl tin chloride; amine hydrochlorides such as dimethylaniline hydrochloride and semicarbazide hydrochloride; boron trifluoride and p-nitrobenzenediazonium fluoroborate; and alcoholates of metals such as titanium, vanadium, zirconium as well as their coordinated polymers obtained by coordination of the alcoholates and their condensates obtained by condensation of the alcoholates in the presence of water.

The addition of fillers comprising powdered metal and in particular a combination of a metallic and non-metallic oxide filler results in a useful coating composition. Suitable metallic fillers include finely divided or powdered metals, exemplified but not limited to aluminum and iron. Non-metallic fillers such as calcium metasilicate and silicon dioxide result in suitable tensile shear strength of the coating. Other suitable non-metallic oxide materials include alumina, calcium carbonate, calcium sulfate, barium sulfate, magnesium silicate, aluminum silicate, kaolin, hydrated alumina and thixotropic agents such as bentonite clays.

The fillers of both metallic and non-metallic oxide can range in average particle size between about 0.1 micron to about 35 micron. The amount of the filler depends upon the extent of the thickening properties of the particular filler chosen.

The preferred ranges for content of materials for coating composition are as follows: A preferable range of the pigment is about 0 to about 80 phr. The amount of filler is present in an amount of 0 to 100 phr. The amount of fillers and pigments depends upon the desired texture, appearance, color or gloss. The catalyst is present in an amount of from about 0.01 phr to about 5.0 phr of resin containing functional hydroxyl groups (A).

Flow agents may be added by itself or as a combination. The flow agents are added at a concentration of about 0.1 to about 2.5 phr, preferably about 1.5 phr.

The coating composition can be applied directly to a substrate, e.g., metal such as steel or aluminum. Non-metallic substrates such as plastics and composites can also be used. Application can be by spraying or by the use of a fluidized bed. Electrostatic spraying is the preferred method. The coating can be applied in a single sweep or in several passes to provide film thickness after cure or in several passes to provide a film thickness of from about $25\mu$ to about $200\mu$.

The coating composition can be prepared by melt blending the ingredients of the coating compositions. This can be accomplished by dry blending the ingredients (A), (B) and (C) described above, together with the above mentioned auxiliary substances or additives and subjecting the blend to a fusion milling at a suitable temperature, i.e., less than the reaction temperature of the respective ingredients (preferably within the range of 80° C. to 130° C.), solidifying the mixture by cooling and subjecting the mixture to pulverization followed by sieving treatment. The solid mixture is pulverized into a particulate blend to have an average particle size not greater than $150\mu$, preferably not greater than $75\mu$. The glass transition temperature of the unreacted coating composition is at least about 30° C., preferably about 75° C., more preferably about 50° C. while the glass transition temperature of the reacted mixture is at least about 75° C. to about 200° C., preferably about 100° C.

The coating composition is applied onto objects to be treated, for example by utilizing the usual coating method such as electrostatic coating method, fluidized bed coating method, electrostatic fluidized bed coating method or the like. Heating the coating film at a temperature within a range about 100° C. to about 300° C., preferably about 150° C. to about 275° C., more preferably 175° C. to about 250° C. for 30 minutes, preferably 20 minutes, more preferably 15 minutes. The coating composition can be exposed after curing at a temperature of about 0° C. to about 300° C. during use.

The coating composition can be used for coating and insulating substrates such as metals and plastic substrates. Examples include products such as space heaters, fireplace casing, kitchen appliances, oven vents, barbecue grill frames, faucets and electric conductors. Other applications would be apparent to one of ordinary skill in the art.

All of the cited patents and publications are incorporated herein by reference. The following specific examples are provided to better assist the reader in the various aspects of practicing the present invention. The prepared examples are described in terms of powder coating. The preparation of liquid coating or other forms of coating is similar to powder coating and is included within the scope of the present invention. As these specific examples are merely illustrative, nothing in the following descriptions should be construed as limiting the invention in any way.

EXAMPLES

Example 1

Preparation of Powder Coating

A mixture of a composition shown in Tables II–V was charged into a 10 lb plastic bag and shaken for 60 seconds. The bag should be able to contain twice the volume of raw materials. The mixture was then kneaded under fusion in a Kneader (Buss Company Ltd). A barrel temperature, a screw temperature and a rotation speed thereof in this treatment were 38° C., 121° C. and 200 r.p.m. respectively. An average resident time was about 50 seconds and the temperature of the discharged product was about 120° C. After cooling, the product was subjected to rough pulverization followed by fine pulverization whereby the resulting composition has an average particle size of about $35\mu$ and the maximum particle size of about $150\mu$ was obtained.

Onto a cleaned and polished cold rolled steel (CRS Q), the powder paint was applied by means of electrostatic spray until a cured coating film of a thickness of about $75\mu$ is obtained. The coating film is then baked for 15 minutes at 204° C. The thermoplasticity, adhesion, color/gloss change of the composition were conducted in accordance with the procedure below. The result of the tests are shown in Table I. As shown in Table I the powder coating composition of the present invention exhibits excellent characteristics in all of the tests as compared to silicone and non-silicone coatings.

The cured powder coating composition was tested on CRS Q panels and kept at 216° C. for up to 100 hours. Color and gloss changes, as well as adhesion to the substrate (cross-hatch test) were measured thereafter.

Example 2

A powder coating composition similar to Example 1 was prepared except that the exposure after baking was conducted at 300° C.

Thermoplasticity

The thermoplasticity of the samples was measured by scratching a $50\mu$ to $75\mu$ baked film with a CRS Q panel at 216° C. After cooling the samples down to room temperature, the different coatings were graded according to the type of mark left on them.

1=superficial mark; 2=deep mark; 3=down to the substrate mark

Color Change

The color change was rated on a room temperature CRS Q panel according to the value of dE between the sample at 0 hr and after 500 hr at 216° C. A MacBeth Color Eye spectrophotometer was employed.

1=dE<5; 2=dE$\geq$5 and $\leq$10; 3=dE>10

Gloss Change

The gloss change was rated on a room temperature CRS Q panel according to gloss change between the sample at 0 hr and after 500 hr at 216° C. The measurement was obtained by BYK gloss meter.

1=gloss change<5; 2=gloss change>5 and<10; 3=gloss change>10

Adhesion

The cross hatch test according to ASTM standard test method D 3359-87 was performed on a $50\mu$ to $75\mu$ film. The samples were graded in accordance with the classification specified in said standard. 3=0B; 2=2B or 1B; 1=5B, 4B or 3B

TABLE I

Test results of the cured coating composition after exposure for 100 hrs at 216° C.

| Composition | Thermo-plasticity tested at 216° C. | Adhesion | Gloss Retention | Color Retention |
|---|---|---|---|---|
| SIL/POLY | 2 | 3 | 1 | 1 |
| POLY/BTDA | 3 | 3 | 3 | 3 |
| POLY/BTDA/SIL | 2 | 3 | 2 | 2 |
| POLY/BTDA/TGIC | 1 | 1 | 1 | 1 |
| POLY/EN/BTDA/TGIC | 1 | 1 | 1 | 1 |
| POLY/BTDA/TGIC/SIL | 2 | 1 | 1 | 1 |
| ACR/BTDA/TGIC | 1 | 1 | 1 | 1 |
| POLY/BTDA/PT910 | 1 | 1 | 1 | 1 |

1 = excellent; 2 = good; 3 = bad
ACR: Hydroxy functional acrylic resin
POLY: Hydroxy functional polyester resin
PT910: Glycidyl esters of terephthalic acid and trimellitic acid
BTDA: 3,3'4,4'-benzophenonetetracarboxylic dianhydride
EN: Epoxy novoloc resin
SIL: Hydroxy functional siloxane
TGIC: Triglycidyl isocyanurate The coating compositions containing hydroxy functional resin, BTDA and TGIC showed improved adhesion after heating.

TABLE II

Examples of SIL/POLY composition

| RAW MATERIAL | DESCRIPTION | AMOUNT (g) |
|---|---|---|
| Dow Corning 1-0543 resin | Poly(methyl-phenyl) siloxane | 70 |
| Rucote 102 | Polyester resin | 30 |
| Resiflow P-67 | Acrylic flow agent | 0.3 |
| Uraflow B | Benzoin (degassing agent) | 1.0 |
| Octaflow ST-70 | Stannous octoate (catalyst) | 0.3 |
| Attagel 36 | attapulgite clay (thickener) | 8.6 |
| Nyad 325 | calcium metasilicate filler | 50 |
| Black 101 | black metal oxide | 20 |

TABLE III

Example of POLY/BTDA composition

| RAW MATERIAL | DESCRIPTION | AMOUNT (g) |
|---|---|---|
| Rucote 102 | Polyester resin | 90 |
| BTDA | Benzophenonetetracarboxylic dianhydride | 10 |
| Uraflow B | Benzoin (degassing agent) | 1 |
| Octaflow ST-70 | Stannous octoate (catalyst) | 0.3 |
| Nyad 325 | Calcium metasilicate filler | 50 |
| Black 101 | Black metal oxide | 20 |

TABLE IV

Example of POLY/BTDA/TGIC composition

| RAW MATERIAL | DESCRIPTION | AMOUNT (g) |
|---|---|---|
| Rucote 102 | Polyester resin | 85 |
| BTDA | Benzophenonetetracarboxylic dianhydride | 8 |
| TGIC | Triglycidyl isocyanurate | 7 |
| Uraflow B | Benzoin (degassing agent) | 1 |
| Octaflow ST-70 | Stannous octoate (catalyst) | 0.75 |
| Nyad 325 | Calcium metasilicate filler | 50 |
| Black 1G | Black metal oxide pigment | 20 |

TABLE V

Example of POLY/EN/TGIC/BTDA composition

| RAW MATERIAL | DESCRIPTION | AMOUNT (g) |
|---|---|---|
| Rucote 102 | Polyester resin | 57.5 |
| Araldite GT 7220 | Epoxy novolac resin | 26.5 |
| TGIC | Triglycidyl isocyanurate | 5 |
| BTDA | Benzophenonetetracarboxylic dianhydride | 11 |
| Resiflow P-67 | Acrylic flow agent | 0.4 |
| Uraflow B | Benzoin (degassing agent) | 1 |
| Octaflow ST-70 | Stannous octoate (catalyst) | 0.75 |
| Nyad 325 | Calcium metasilicate filler | 50 |
| Black 1G | Black metal oxide pigment | 20 |

TABLE VI

Example of POLY/BTDA/PT910 composition

| RAW MATERIAL | DESCRIPTION | AMOUNT (g) |
|---|---|---|
| Rucote 102 | Polyester resin | 88 |
| Araldite PT-910 | Glycidyl ester | 7 |

TABLE VI-continued

Example of POLY/BTDA/PT910 composition

| RAW MATERIAL | DESCRIPTION | AMOUNT (g) |
|---|---|---|
| BTDA | Benzophenonetetracarboxylic dianhydride | 5 |
| Uraflow B | Benzoin (degassing agent) | 1 |
| Octaflow ST-70 | Stannous octoate (catalyst) | 0.3 |
| Nyad 325 | Calcium metasilicate filler | 50 |
| Black 1G | Black metal oxide pigment | 20 |

TABLE VII

Example of ACR/BTDA/TGIC composition

| RAW MATERIAL | DESCRIPTION | AMOUNT (g) |
|---|---|---|
| Johncryl 587 | Hydroxy functional acrylic | 88 |
| TGIC | Triglycidyl isocyanurate | 7 |
| BTDA | Benzophenonetetracarboxylic dianhydride | 5 |
| Uraflow B | Benzoin (degassing agent) | 1 |
| Octaflow ST-70 | Stannous octoate (catalyst) | 0.75 |
| Nyad 325 | Calcium metasilicate filler | 50 |
| Black 1G | Black metal oxide pigment | 20 |

The above examples have been depicted solely for the purpose of exemplification and are not intended to restrict the scope or embodiments of the invention. The invention is further illustrated with reference to the claims that follow thereto.

What is claimed is:

1. A high temperature resistant coating composition comprising a mixture of:
    a) at least one resin containing functional hydroxyl groups (A) selected from the group consisting of a polyester resin, acrylic resin, allyl alcohol containing resin and mixtures thereof;
    b) at least one polyfunctional epoxy resin (B); and
    c) at least one anhydride compound (C).

2. The coating composition according to claim 1 wherein the resin containing functional hydroxyl groups (A) has a weight average molecular weight of from about 500 to about 10,000.

3. The coating composition according to claim 2 wherein the resin containing functional hydroxyl groups (A) has a hydroxyl value of about 10 to about 300 mg KOH/g.

4. The coating composition according to claim 3 wherein the resin containing functional hydroxyl groups (A) has a glass transition temperature of about 30° C. to about 75° C.

5. The coating composition according to claim 1 wherein the polyfunctional epoxy resin (B) is selected from the group consisting of epoxy novolac resin, bisphenol A epoxy resin, urethane modified bisphenol A epoxy resin, cresol novolak epoxy resin, alicyclic epoxy resin, bisphenol S epoxy, hydrogenated bisphenol A epoxy resin, aliphatic epoxy resin, glycidyl functional acrylic resin, glycidyl functional silicone resin and mixtures thereof.

6. The coating composition according to claim 1 wherein the polyfunctional epoxy resin (B) is selected from the group consisting of trigylcidylisocyanurate compound, methyl substituted trigylcidylisocyanurate, ethyl substituted trigylcidylisocyanurate, polyglycidyl ethers, polyglycidyl esters, polygylcidyl derivatives of aromatic amines and aminophenols, epoxy novolac resin, glycidyl functional silicone resin, mixture of glycidyl ester of trimellitic acid and terephthalic acid, and mixtures thereof.

7. The coating composition according to claim 1 wherein the anhydride compound (C) is selected from the group consisting of trimellitic anhydride, phthalic anhydride, pyromellitic anhydride, succinic anhydride, 1,8-naphthalic anhydride, 1,2-cyclohexanedicarboxylic anhydride, sebacic anhydride, maleic anhydride, azelaic anhydride, citric acid anhydride, hexahydrophthalic anhydride, tetrahydrophthalic anhydride, dodecanedioic anhydride, octadecenyl succinic anhydride, dodecenyl succinic anhydride, octenyl succinic anhydride, methylhexahydrophthalic anhydride, 2,3,6,7-naphthalene tetracarboxylic acid dianhydride, ethylene bis (trimellitate(dianhydride, glycerin tris(trimellitate) trianhydride, bisphenol A bis(trimellitate(trianhydride, trimellitic anhydride, cyclohexane tetracarboxylic dianhydride, butane tetracarboxylic dianhydride, tetrahydrofuran dianhydride, tetracarboxylic dianhydride, pyromellitic dianhydride, 3,3',4,4'-benzophenone tetracarboxylic dianhydride and mixtures thereof.

8. The coating composition according to claim 1, further comprising auxiliary substances selected from the group consisting of fillers, pigments and mixtures thereof.

9. The coating composition according to claim 1, further comprising additives selected from the group consisting of flow agents, plasticizers, degassing agents, hardening catalysts, surface regulating agents, wetting agents, fluidizing agents, silicone compounds, adhesion promoter and mixtures thereof.

10. The coating composition according to claim 1 wherein the resin containing functional hydroxyl groups (A) component is present in an amount of about 10 to about 80 phr.

11. The coating composition according to claim 6 wherein the polyfunctional epoxy resin (B) is present in an amount of about 0 to about 50 phr.

12. The coating composition according to claim 7 wherein the polyfunctional epoxy resin (B) is present in an amount of about 0.1 to about 30 phr.

13. The coating composition according to claim 8 wherein the anhydride (C) component is present in an amount of 0.1 to about 30 phr.

14. The coating composition according to claim 1 capable of being exposed after curing at a temperature of about 0° C. to about 300° C.

15. A high temperature resistant coating comprising the reaction product of the composition of claim 1.

16. The coating composition according to claim 1 comprising:
    a) from about 10 to about 80 phr of at least one resin containing functional hydroxyl groups (A) having a hydroxyl value of about 10 to about 300 mgkDH/g and a weight molecular weight in the range of from about 500 to about 10,000;
    b) from about 0.1 to about 30 phr of at least one polyfunctional epoxy compound (B); and
    c) from about 0.1 to about 30 phr of at least one anhydride compound (C).

17. The coating composition according to claim 15 wherein the reacted coating composition has a glass transition temperature of about 75° C. to about 150° C.

18. A method of coating a substrate with a coating composition comprising the steps of:
    a) providing a coating composition of claim 1
    b) applying to at least one substrate a layer of the coating composition; and
    c) curing the coating layer by heating at a temperature range of about 100° C. to about 275° C.

19. The method according to claim 18 wherein the polyfunctional epoxy resin (B) is selected from the group consisting of trigylcidylisocyanurate compound, methyl substituted trigylcidylisocyanurate, ethyl substituted trigylcidylisocyanurate, polyglycidyl ethers, polyglycidyl esters, polyglycidyl derivatives of aromatic amines and aminophenols, epoxy novolac resin, glycidyl functional silicone resin, mixture of glycidyl ester of trimellitic acid terephthalic acid, and mixtures thereof.

20. The method according to claim 18 wherein the anhydride compound (C) is selected form the group consisting of trimellitic anhydride, phthalic anhydride, pyromellitic anhydride, succinic anhydride, 1,8-naphthalic anhydride, 1,2-cyclohexanedicarboxylic anhydride, sebacic anhydride, maleic anhydride, azelaic anhydride, citric acid anhydride, hexahydrophthalic anhydride, tetrahydrophthalic anhydride, dodecanedioic anhydride, octadecenyl succinic anhydride, dodecenyl succinic anhydride, octenyl succinic anhydride, methylhexahydrophthalic anhydride, 2,3,6,7-naphthalene tetracarboxylic acid dianhydride, ethylene bis(trimellitate (dianhydride, glycerin tris(trimellitate)trianhydride, bisphenol A bis(trimellitate(trianhydride, trimellitic anhydride, cyclohexane tetracarboxylic dianhydride, butane tetracarboxylic dianhydride, tetrahydrofuran dianhydride, tetracarboxylic dianhydride, pyromellitic dianhydride, 3,3',4,4'-benzophenone tetracarboxylic dianhydride and mixtures thereof.

21. The method according to claim 18 wherein the polyfunctional epoxy resin (B) is selected from the group consisting of epoxy novolac resin, bisphenol A epoxy resin, urethane modified bisphenol A epoxy resin, cresol novolak epoxy resin, alicyclic epoxy resin, bisphenol S epoxy, hydrogenated bisphenol A epoxy resin, aliphatic epoxy resin, glycidyl functional acrylicresin, glycidyl functional silicone resin, and mixtures thereof.

22. The method according to claim 18, further comprising the addition of additives selected from the group consisting of flow agents, plasticizers, controlling agent, hardening catalyst, surface regulating agent, wetting agent, fluidizing agent, adhesion promoter, and mixtures thereof.

23. The method according to claim 18, further comprising the addition of auxiliary substances selected from the group consisting of fillers, pigments and mixtures thereof.

24. An article comprising a substrate and coated on at least one surface of said substrate with the coating of claim 15.

25. The coating composition according to claim 1 prepared by a method comprising the steps of:
  a) dry blending the hydroxy functional resin (A), polyfunctional epoxy resin (B) and anhydride compound (C) together;
  b) subjecting the blend to fusion milling at a suitable temperature;
  c) solidifying the mixture by cooling; and
  d) pulverizing the solidified mixture.

26. The coating composition according to claim 1 wherein the hydroxy functional resin is a polyester resin.

* * * * *